United States Patent

Barnes, II

[11] Patent Number: 5,957,801
[45] Date of Patent: Sep. 28, 1999

[54] COIL SPRING PRELOAD FOR PARALLEL-AXIS DIFFERENTIAL

[75] Inventor: Noel R. Barnes, II, Honeoye Falls, N.Y.

[73] Assignee: Zexel Torsen Inc., Rochester, N.Y.

[21] Appl. No.: 09/075,616

[22] Filed: May 11, 1998

[51] Int. Cl.⁶ ............................. F16H 48/10; F16H 48/22
[52] U.S. Cl. ............................................................. 475/249
[58] Field of Search ................................. 475/249, 252

[56] References Cited

U.S. PATENT DOCUMENTS

| | | |
|---|---|---|
| 3,375,736 | 4/1968 | Saari . |
| 5,139,467 | 8/1992 | Carpenter . |
| 5,169,370 | 12/1992 | Dye et al. . |
| 5,232,417 | 8/1993 | Amborn et al. ........................ 475/252 |
| 5,362,284 | 11/1994 | Brewer . |
| 5,415,601 | 5/1995 | Cilano . |
| 5,462,497 | 10/1995 | Cilano ..................................... 475/252 |
| 5,529,547 | 6/1996 | Okuda et al. . |
| 5,556,344 | 9/1996 | Fox . |
| 5,733,216 | 3/1998 | Bowerman . |

FOREIGN PATENT DOCUMENTS

| | | |
|---|---|---|
| 879671 | 10/1961 | United Kingdom . |
| 927924 | 6/1963 | United Kingdom . |
| 1019844 | 2/1966 | United Kingdom . |
| 1023684 | 3/1966 | United Kingdom . |
| 1136959 | 12/1968 | United Kingdom . |
| 1157472 | 7/1969 | United Kingdom . |

*Primary Examiner*—Dirk Wright
*Attorney, Agent, or Firm*—Eugene Stephens & Associates

[57] ABSTRACT

A coil spring preload system is applied to a parallel-axis differential having a thrust block interposed between ends of axles splined to side gears within the differential. A pair of spring plates are interposed between the thrust block and the side gears, and the spring plates retain preload coil springs arranged in sectors between the thrust block and planetary gears of the differential. The spring plates are retained against rotation relative to the differential housing, preferably by piloting against the planetary gears. U-shaped access openings in the spring plates to allow application of C-clips retaining axle ends within the differential are preferably closed by filler plates having the same thickness as the spring plates.

45 Claims, 5 Drawing Sheets

COIL SPRING PRELOAD FOR PARALLEL-AXIS DIFFERENTIAL

TECHNICAL FIELD

Preloading of parallel-axis differentials.

BACKGROUND

Spring preload systems are applied to parallel-axis differentials to create a resistance to differentiation. An advantage of this is having the differential apply a torque to both wheels until a differentiation threshold is exceeded. This allows light torque to reach one of a pair of driven wheels, even when its mate has lost traction.

Preloads for this purpose have been applied to parallel-axis differentials by spring washers, but these are problematic since the force of spring washers varies considerably with small changes in axial dimensions. Coil springs have been suggested for preloading parallel-axis differentials, as proposed by Saari in U.S. Pat. No. 3,375,736. Coil springs work better for preload purposes, because they are less sensitive to variation in axial dimensions.

Some cars and trucks require parallel-axis differentials with thrust blocks interposed between the ends of axles splined to side gears of the differentials. This is necessary to provide access for attaching C-clips holding ends of the axles within the differential. The necessary access and the presence of a thrust block between axle ends within a differential requires that planetary gears be arranged beyond the perimeter of the thrust block. With a central space between the axle ends occupied by a thrust block, and the planetary gears being crowded into sectors beyond the perimeter of the thrust block, there remains no room for any of the previously suggested ways of applying a preload to a parallel-axis differential.

SUMMARY OF THE INVENTION

I have devised an effective way of applying a coil spring preload to a parallel-axis differential that includes a thrust block between axle ends and planetary gears arranged in regions beyond the perimeter of the thrust block. My preload system interposes a pair of spring plates between the thrust block and side gears in regions around the axle ends. Coil springs are compressed between the spring plates so as to bias the side gears apart, and friction clutches are arranged between a housing and faces of the side gears opposite the spring plates. Two small sectors of available space exist between the thrust block and the planetary gears, and the coil springs are arranged within these sectors. The coil springs then bias the side gears apart, preferably adding to an outward bias from forwardly applied torque, so that the side gears are preloaded by frictionally engaging the spring plates and the clutch surfaces between the side gears and the housing.

The spring plates are preferably U-shaped in configuration to allow access to axle ends to apply C-clips during assembly. Filler plates having the same thickness as the spring plates are configured to fill the U-shaped openings in regions outside the axles. The side gears then thrust against the spring plates and the filler plates in regions supported by the thrust block in response to deceleration torque.

The spring plates are held from rotating relative to the differential housing, and a preferred way of accomplishing this is by giving the spring plates scalloped edges that bear against planetary gears. This has an additional advantage of adding somewhat to frictional resistance against differentiating.

DRAWINGS

DETAILED DESCRIPTION

Figure 1:
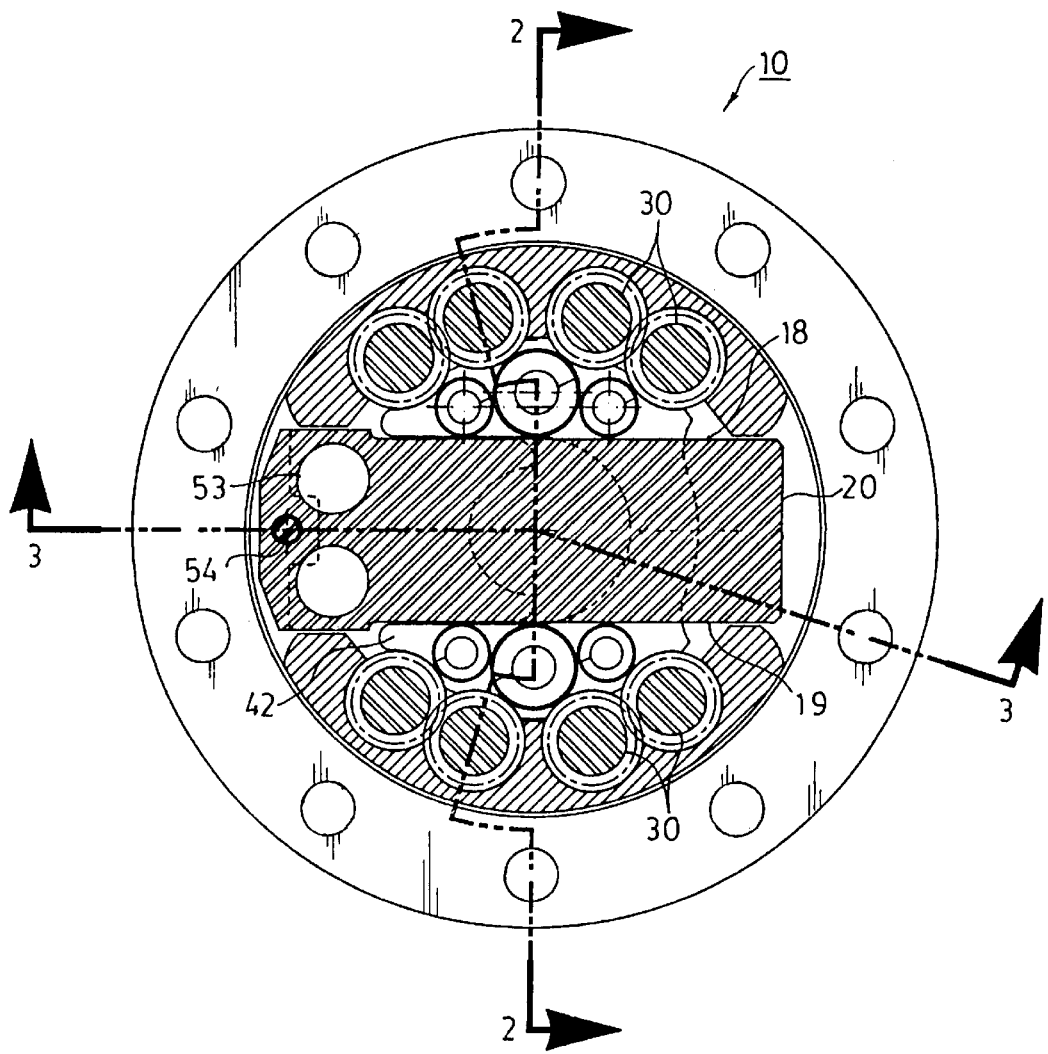
FIG. 1 is a cross-sectional view in a radial plane of a preferred embodiment of a parallel-axis differential having a thrust block and a coil spring preload according to my invention.
Figure 2:
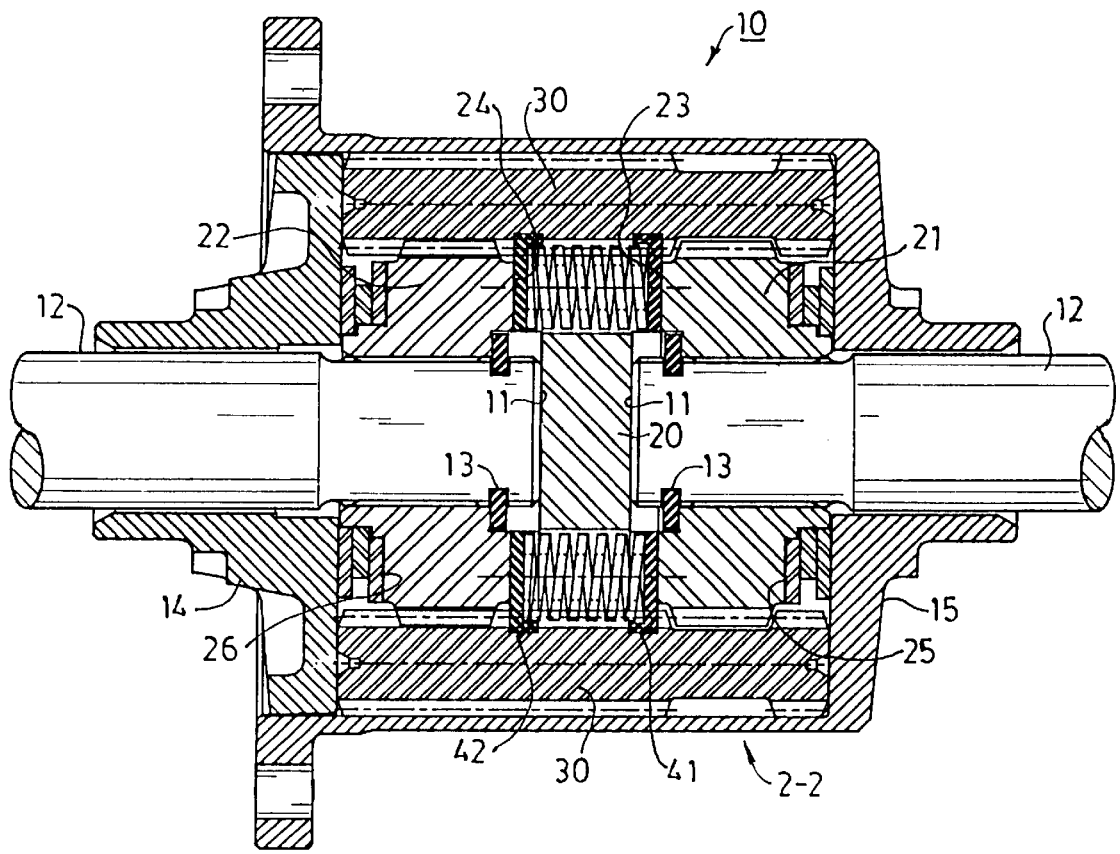
FIG. 2 is a cross-sectional view in an axial plane of the differential of FIG. 1, taken along the line 2—2 thereof.
Figure 3:
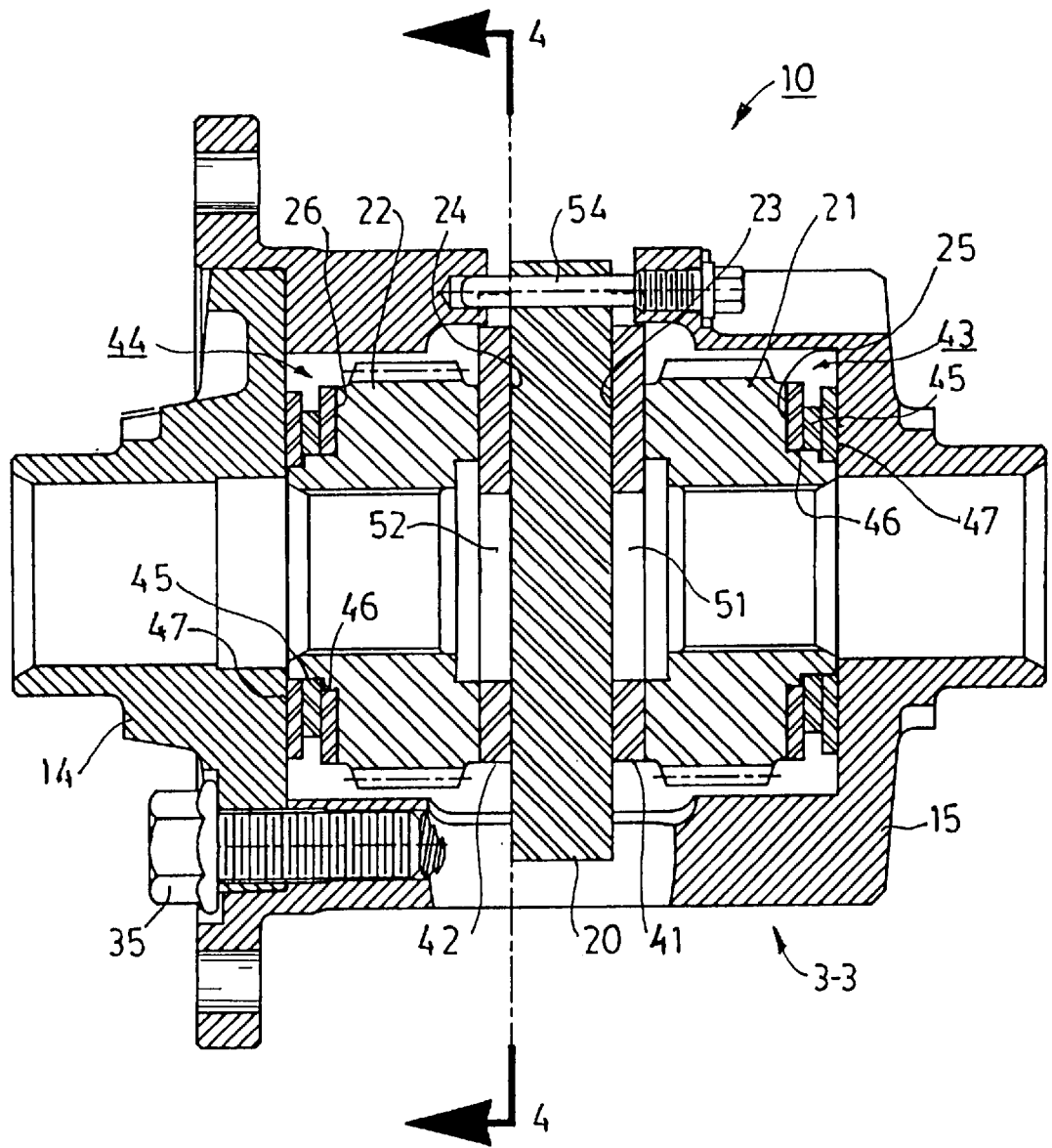
FIG. 3 is a cross-sectional view in an axial plane of the differential of FIG. 1, taken along the line 3—3 thereof, with axles and C-clips omitted.
Figure 4:
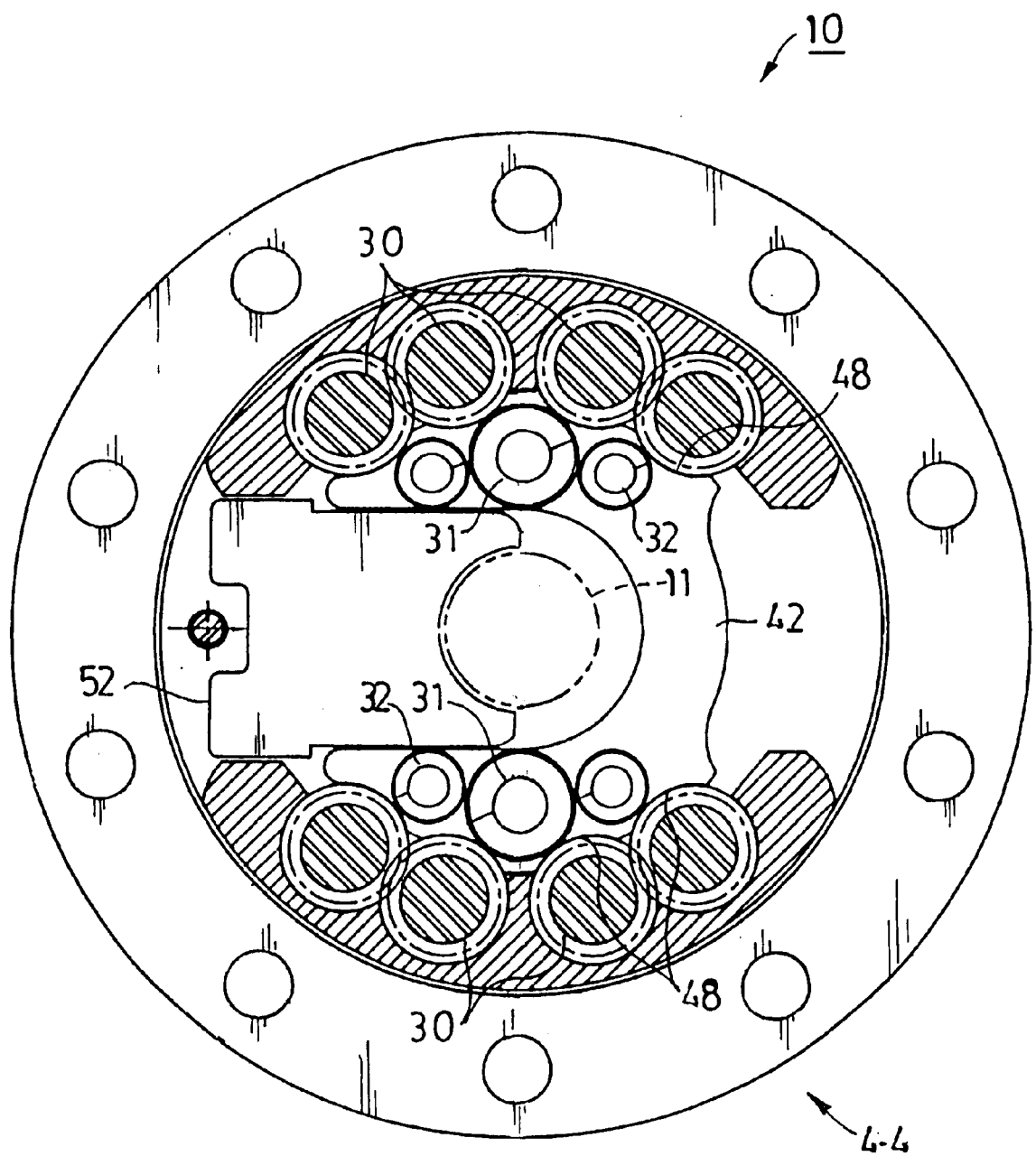
FIG. 4 is a cross-sectional view in a radial plane of the differential of FIG. 3, taken along the line 4—4 thereof.
Figure 5:
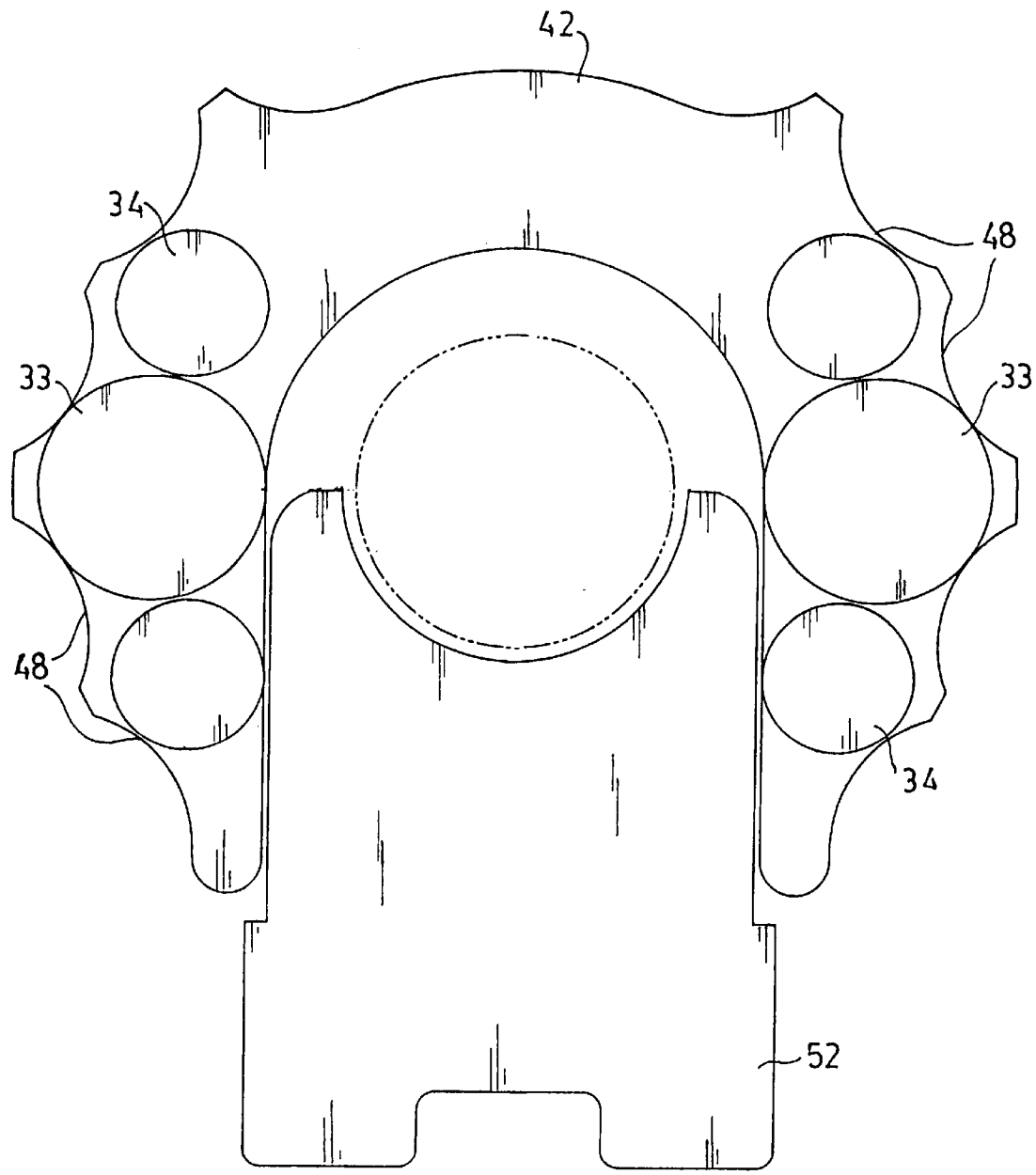
FIG. 5 is an elevational view of a spring plate and a filler plate configured in a way that is preferred for my invention.

This invention devises a way of applying a coil spring preload to a parallel-axis differential having a thrust block. An example of such a differential is disclosed in co-assigned U.S. Pat. No. 5,733,216, entitled THRUST-BLOCK FOR C-CLIP DIFFERENTIAL. For illustrating the invention of this application, parallel-axis differential 10 has a thrust block 20 arranged between ends 11 of a pair of axles 12 splined to a respective pair of side gears 21 and 22. C-clips 13 hold axles 12 within differential 10.

Planetary gears 30 extend between side gears 21 and 22 on axes parallel with axles 12 and side gears 21 and 22. Planetary gears 30 are arranged on opposite sides of thrust block 20 in regions beyond a perimeter of thrust block 20 so as to bridge a space between side gears 21 and 22 in regions not occupied by thrust block 20. This leaves a pair of small sectors available for preload coil springs arranged between planetary gears 30 and longitudinal edges 18 and 19 of thrust block 20. Coil springs 31 and 32 are arranged within these sectors and are sized to be as large as practically possible and therefore apply a suitably large preload bias.

A pair of spring plates 41 and 42 are arranged between thrust block 20 and side gears 21 and 22 where spring plates 41 and 42 engage faces 23 and 24 of side gears 21 and 22. Spring plates 41 and 42 have recesses 33 and 34 sized for receiving ends of springs 31 and 32 for holding the springs in predetermined positions. Each of the springs 31 and 32 has the same axial length so that the springs fit uniformly between spring plates 41 and 42. Springs 32 have smaller diameters than springs 31 to fit within the available sectors between thrust block 20 and planetary gears 30, and it is also possible to arrange smaller diameter springs within the inside diameters of larger springs 31.

When a cover 14 is secured to a housing 15 of differential 10 by screws 35, springs 31 and 32 are compressed between spring plates 41 and 42, which apply a preload bias urging side gears 21 and 22 apart.

Opposite faces 25 and 26 of side gears 21 and 22 engage friction clutches 43 and 44, which preferably have multiple friction faces. Friction clutch 43 is arranged between side gear 21 and housing 15, and friction clutch 44 is arranged between side gear 22 and cover 14. A preferred way to achieve multiple friction faces for each of the friction clutches 43 and 44 is with clutch elements 45 splined to side gears 21 and 22 for rotation between clutch elements 46 and 47, which are held against rotation.

Side gears 21 and 22 are preferably formed to have an outward bias in response to forward driving torque so that side gear faces 25 and 26 press against friction clutches 43 and 44 when outwardly biased. The preload applied by coil springs 31 and 32 adds to this outward bias, urging side gears 21 and 22 against clutches 43 and 44 with additional force supplied by springs 31 and 32. This creates additional resistance to differentiation between side gears 21 and 22, since any such differential rotation must overcome the friction created between the side gears and spring plates 41 and 42 and friction clutches 43 and 44.

Spring plates 41 and 42 have general U-shapes that are preferably aligned with each other and with the direction of insertion of thrust block 20. This allows access to axle ends 11 during assembly of differential 10 so that C-clips 13 can be attached to axles 12. After this is accomplished, then filler plates 51 and 52 are inserted into the U-shaped recesses in spring plates 41 and 42. Filler plates 51 and 52 are preferably the same thickness as spring plates 41 and 42 and are configured to fill the U-shaped spaces in spring plates 41 and 42 around or outside of axle ends 11, which bear directly against thrust block 20. When differential 10 is subject to deceleration force, side gears 21 and 22 thrust inward against spring plates 41 and 42 and filler plates 51 and 52. The inward thrust of side gears 21 and 22 is borne by filler plates 51 and 52 and spring plates 41 and 42 in regions that are backed up and separated by thrust block 20, which is inserted between the spring and filler plates after the filler plates are assembled.

Spring plates 41 and 42 are preferably held from rotating relative to housing 15. This can be accomplished by a configuration that causes rotation-blocking engagement between the spring plates and housing 15, but even better than this is having spring plates 41 and 42 pilot against planet gears 30 to prevent rotation of the spring plates. This can be accomplished by forming scallops 48 shaped to bear against planetary gears 30 at an outer periphery of spring plates 41 and 42. Friction between the spring plates and the planetary gears then adds somewhat to differentiating resistance. A similar piloting of non-rotational clutch elements 46 and 47 on the planetary gears can be used to prevent these clutch elements from rotating.

Filler plates 51 and 52 are necessarily also held against rotation by spring plates 41 and 42. Filler plates 51 and 52 are held in axial position between thrust block 20 and ends 11 of axles 12 and are preferably held in radial position by engagement with housing 15. Holes 53 are for balancing thrust block 20, which is preferably held in radial position by a screw 54. As screws 35 tighten cover 14 to a closed position over the otherwise open end of housing 15, the closure movement of cover 14 compresses preload springs 31 and 32. This establishes the desired preload resisting differentiation; and since the preload is applied via coil springs, it remains close to constant, even after surfaces within differential 10 experience some axial wear.

I claim:

1. A coil spring preload system for a parallel-axis differential, the system comprising:
   a. a plurality of coil springs compressed between a pair of plates for biasing the plates apart;
   b. the plates being arranged on opposite sides of a thrust block engaging ends of axles splined in side gears of the differential;
   c. the plates being arranged between the thrust block and the side gears and having openings allowing the axles to engage the thrust block;
   d. the plates engaging side gears of the differential for biasing the side gears apart; and
   e. the coil springs being arranged in a pair of sectors beyond peripheries of the thrust block and between the thrust block and planetary gears of the differential.

2. The system of claim 1 wherein the plates have aligned openings oriented along an axis of the thrust block and allowing access to the axles.

3. The system of claim 2 including filler plates having the same thickness as the spring plates and arranged for filling regions of the end openings spaced from the axles.

4. The system of claim 1 including multi-face clutch surfaces arranged between a housing for the differential and surfaces of the side gears opposite the spring plates.

5. The system of claim 1 wherein the side gears are configured so that bias of the coil springs adds to outward thrust tending to separate the side gears in response to forward driving torque.

6. The system of claim 1 wherein the spring plates are formed with recesses to receive ends of the coil springs.

7. The system of claim 6 wherein the coil springs have substantially the same length.

8. The system of claim 1 including a cover and a housing for the differential configured so that securing the cover to the housing compresses the springs.

9. The system of claim 1 wherein the spring plates are scalloped to bear against planetary gears of the differential.

10. The system of claim 1 wherein the spring plates are retained against rotation relative to a housing of the differential.

11. A preloaded parallel-axis differential having side gears spaced apart on opposite sides of a thrust block engaging ends of axles splined to the side gears, the differential comprising:
    a. a spring plate arranged between each side gear and the thrust block to extend at least part way around each respective axle;
    b. the spring plates having scalloped edges that bear against planetary gears of the differential to keep the spring plates from rotating relative to the planetary gears;
    c. a plurality of coil springs arranged between the spring plates for biasing the spring plates apart and thereby biasing the side gears apart; and
    d. the coil springs being arranged in a pair of sectors lying within the planetary gears and outside the thrust block.

12. The differential of claim 11 wherein the spring plates have U-shaped openings extending around and allowing access to the axles.

13. The differential of claim 12 including filler plates the same thickness as the spring plates and arranged for filling space within the U-shaped openings around the axles.

14. The differential of claim 11 including clutch surfaces arranged between the side gears and a housing for the differential.

15. The differential of claim 11 wherein the coils springs are compressed by a cover secured to a housing of the differential.

16. The differential of claim 11 wherein the side gears are configured so that bias of the coil springs adds to outward thrust tending to separate the side gears in response to forward driving torque.

17. A method of preloading a parallel-axis differential having side gears splined to axles engaging opposite surfaces of a thrust block interposed between the axles and the side gears, the method comprising:
    a. interposing spring plates between the side gears and the thrust block to extend at least part way around the axles and to extend toward planetary gears of the differential beyond a periphery of the thrust block;
    b. compressing coil springs between the spring plates in regions between the thrust block and the planetary gears; and c. piloting the spring plates on the planetary gears to prevent the spring plates from rotating relative to the planetary gears.

18. The method of claim 17 including interposing clutch surfaces between the side gears and a housing for the differential.

19. The method of claim 17 including compressing the coil springs by securing together a cover and a housing for the differential.

20. The method of claim 17 including arranging openings in the spring plates to allow access to the axles during assembly and then closing the openings in the spring plates with filler plates.

21. The method of claim 17 including holding the spring plates against rotation relative to a housing of the differential.

22. In a parallel-axis differential having side gears spaced apart on opposite sides of a thrust block engaging ends of axles splined to the side gears, an improvement comprising:

a. a plurality of coil springs compressed between the side gears for biasing the side gears outward to apply a preload;

b. the springs being compressed between spring plates interposed between the side gears and the thrust block in a region around the axles; and c. multi-surface friction clutches arranged between a housing for the differential and outside surfaces of the side gears opposite the spring plates.

23. The improvement of claim 22 wherein the spring plates have U-shaped openings arranged around the axles and allowing access to the axles.

24. The improvement of claim 23 including filler plates arranged for filling the U-shaped openings in regions clear of the axles.

25. The improvement of claim 22 wherein the spring plates are held against rotation relative to a housing of the differential.

26. The improvement of claim 25 wherein the spring plates have scalloped edges bearing against planetary gears of the differential.

27. The improvement of claim 22 wherein the coil springs are arranged in a pair of symmetrical arrays disposed between planetary gears of the differential and a periphery of the thrust block.

28. The improvement of claim 22 wherein the spring plates have recesses receiving ends of the coil springs.

29. The improvement of claim 22 wherein the coil springs are compressed by closure of the housing.

30. A coil spring preload system applied to a parallel-axis differential having side gears spaced apart on opposite sides of a thrust block engaging axles splined to the side gears, the preload system comprising:

a. a plurality of coil springs compressed between a pair of spring plates that are interposed between the thrust block and the side gears in a region around the axles to engage confronting surfaces of the side gears;

b. the spring plates being fixed against rotation relative to a housing of the differential; and c. the coil springs being arranged in a pair of symmetrical arrays located in radial sectors between the thrust block and planetary gears for the differential.

31. The system of claim 30 including spring plates having scalloped edges engaging the planetary gears to prevent rotation of the spring plates.

32. The system of claim 30 including clutch surfaces arranged between the side gears and a housing for the differential.

33. The system of claim 32 wherein the coil springs are compressed by closure of the housing.

34. The system of claim 30 wherein the spring plates have U-shaped openings occupied by the axles and allowing access to the axles.

35. The system of claim 34 including filler plates dimensioned for closing regions of the U-shaped openings clear of the axles.

36. The system of claim 30 wherein the spring plates have recesses receiving ends of the coil springs.

37. The system of claim 36 wherein the coil springs have substantially the same length.

38. The system of claim 30 wherein bias of the coil springs adds to an outward thrust of the side gears in response to forward driving torque.

39. A preloaded parallel-axis differential having side gears spaced apart on opposite sides of a thrust block engaging ends of axles splined to the side gears, the differential comprising:

a. a plurality of coil springs compressed between a pair of spring plates;

b. each of the spring plates being interposed between the thrust block and one of the side gears in a region around the axles so that the spring plates engage confronting surfaces of the side gears;

c. the spring plates extending around the axles in generally U-shaped configurations allowing access to ends of the axles;

d. a pair of filler plates fitting between the thrust block and the side gears and dimensioned for closing regions of the U-shaped configurations clear of the axles; and e. the filler plates having the same thickness as the spring plates.

40. The differential of claim 39 wherein the spring plates are fixed against rotation relative to a housing of the differential.

41. The differential of claim 39 including clutch surfaces arranged between the side gears and a housing for the differential.

42. The differential of claim 39 wherein the coil springs are compressed by closing a housing for the differential.

43. The differential of claim 39 wherein the spring plates have recesses receiving ends of the coil springs.

44. The differential of claim 39 wherein bias of the coil springs adds to an outward thrust of the side gears in response to forward driving torque.

45. The differential of claim 39 wherein the spring plates have scalloped edges engaging planetary gears of the differential to prevent rotation of the spring plates.

* * * * *